United States Patent [19]

Banhardt et al.

[11] Patent Number: 5,714,216
[45] Date of Patent: Feb. 3, 1998

[54] GLASS TUBE CONTAINING A TWO-COMPONENT ADHESIVE, A PROCESS FOR THE PREPARATION THEREOF, AND USE THEREOF

[75] Inventors: Volker Banhardt, Ballrechten-Dottingen; Ulrich Koberski, Löffingen-Dittishausen, both of Germany

[73] Assignee: Koch Marmorit GmbH, Bollschweil, Germany

[21] Appl. No.: 624,479

[22] PCT Filed: Oct. 21, 1994

[86] PCT No.: PCT/EP94/03472

§ 371 Date: Apr. 4, 1996

§ 102(e) Date: Apr. 4, 1996

[87] PCT Pub. No.: WO95/11285

PCT Pub. Date: Apr. 27, 1995

[30] Foreign Application Priority Data

Oct. 23, 1993 [DE] Germany .................. 43 36 216.8

[51] Int. Cl.$^6$ .................................................. E21B 33/00
[52] U.S. Cl. .......................... 428/34.4; 428/34.7; 52/698; 206/219; 206/220; 411/82; 411/258; 156/314; 156/310; 156/293; 156/294
[58] Field of Search ................. 52/698; 206/219, 206/220; 411/82, 258; 405/259.6; 156/314, 310, 293, 294; 428/34.4, 34.7

[56] References Cited

U.S. PATENT DOCUMENTS 4,686,272  8/1987  Wallace .................... 528/87

FOREIGN PATENT DOCUMENTS

| | | | |
|---|---|---|---|
| 0209080A1 | 9/1986 | European Pat. Off. | |
| 0249701A2 | 8/1987 | European Pat. Off. | |
| 1253773 | 11/1960 | France . | |
| 789698 | 1/1973 | France . | |
| 3411253 | 10/1984 | Germany | 52/698 |
| 977806 | 11/1982 | U.S.S.R. | 405/259.6 |
| 1506131 | 9/1989 | U.S.S.R. | 405/259.6 |
| 1606709 | 11/1990 | U.S.S.R. | 405/259.6 |
| 1408366 | 10/1975 | United Kingdom | 405/259.6 |

*Primary Examiner*—Charles Nold
*Attorney, Agent, or Firm*—Jacobson, Price, Holman & Stern, PLLC

[57] ABSTRACT

The storable glass tube sealed on both sides contains the two components of a two-component adhesive and fibers or chips incorporated therein in separate sections which are in immediate contact, being located in said glass tube such that there are portions of both components present at as many as possible intersecting planes perpendicular to the longitudinal axis of said glass tube.

17 Claims, No Drawings

GLASS TUBE CONTAINING A TWO-COMPONENT ADHESIVE, A PROCESS FOR THE PREPARATION THEREOF, AND USE THEREOF

The object of the present invention is a storable glass tube sealed on both sides and containing both components of a two-component adhesive as well as fibers or chips which can be used for introducing said two-component adhesive and said fibers or chips in boreholes for anchoring fastening elements, in particular screws, anchors, clamps and bolts, as well as a process for the preparation thereof and the use thereof.

From WO 92/18697, there is known a process and means for anchoring fastening elements in boreholes wherein the boreholes are filled with a compressible mixture of highly wear-resistant metal, polymer and/or ceramic fibers or chips whose average lengths are less than half the diameter of the borehole, followed by introducing the two components of the adhesive consecutively or simultaneously and then inserting the remainder of the necessary quantity of fibers or chips. Further, there is described the processing of a compressible mixture of highly wear-resistant fibers or chips with the two components of the adhesive to yield a kneadable composition which is pressed into the boreholes.

Said process and means for anchoring fastening elements in bore-holes have been found to be excellently useful, resulting in hitherto unknown strengths. One drawback of said process and means is that they have to be prepared in situ. Special difficul- ties are encountered in this process with boreholes in ceilings. But even the insertion of these means into horizontal boreholes involves some difficulties.

It has been known to use glass cartridges which contain several components of a synthetic resin and silica sand, wherein a special hardener is present in a smaller sealed glass tube which is enclosed in the glass cartridge which hardener will initiate polymerization of the synthetic resin. These glass tubes are inserted into the borehole and disrupted when the fastening element is introduced wherein a hardening plastic mortar is formed which bonds the fastening element within the borehole. These cartridges and the bonding anchor prepared therewith are described in detail in the Kunststoff-Handbuch 10., DUROPLASTE, Hanser 1988, pages 881 to 883.

These glass cartridges have the drawback that they are not suitable for two-component adhesives reacting by polyaddition which consist of two approximately equal amounts of the two components. The insertion of an approximately equal amount of a two-component adhesive into a sealed tube which has to be inserted into a larger sealed tube is very difficult for mere spatial reasons. It is still more difficult to further introduce the necessary amount of fibers or chips in this mixture.

Another drawback of the prior art glass cartridges is the relatively low heat resistance of the synthetic resins formed and their sensitivity towards alkali and moisture.

Therefore, it is the object of the present invention to provide the two components of a two-component adhesive which will react by polyaddition and the necessary amount of fibers or chips within a glass cartridge which is well storable and easy to handle so that the proven components according to WO 92/18697 can also be inserted into horizontal boreholes and into boreholes in ceilings. Furthermore, the anchorages formed should be resistant to heat, alkali and moisture.

These objects have now been achieved surprisingly easily by glass tubes sealed on both sides and containing at least one portion each of compositions A and B wherein composition A consists of a mixture of the first component of a two-component adhesive which will react by polyaddition, and fibers or chips incorporated therein which mixture is viscous at room temperature and liquid at elevated temperatures, and composition B consists of a mixture of the second component of a two-component adhesive and fibers or chips incorporated therein which mixture is viscous at room temperature and liquid at elevated temperatures, wherein said compositions A and B are in immediate contact, being located in said glass tube such that there are both portions of composition A and portions of composition B present at as many as possible intersecting planes perpendicular to the longitudinal axis of said glass tube to yield a high degree of axial juxtaposition of the compositions.

For it has been shown that compositions A and B can be filled into a bottom-sealed glass tube at an elevated temperature through separate feeding tubes simultaneously or consecutively in portions. If such tubes are allowed to cool in a low-motion condition, only a thin film of hardened two-component adhesive will form only at the interface between the two compositions. The major amount of the two components remains separated by this forming film. Thus, the bulk thereof will only react when introduced into a borehole and mixed by turning in or knocking in the fastening element. Also, since the two compositions already contain the necessary amount of fibers or chips, a hardenable mixture will form after disruption of the glass tube and mixing of the two compositions A and B which is comparable to that formed in the process according to WO 92/18697.

In order to ensure thorough mixing and reacting of the two components of the two-component adhesive within the borehole, the fastening element should be rotated and/or vibrated after the disruption of the glass tube. This is most simply done with a drilling machine or percussion drilling machine. Therefore, provision should be made that both portions of composition A and portions of composition B be present at as many as possible intersecting planes perpendicular to the longitudinal axis of the glass tube.

This is achieved in an optimum manner if the portions of compositions A and B are arranged in a parallel, side-by-side mode in the axial direction and their respective cross-sections have the approximate shape of adjacent circular segments. To this end, compositions A and B are filled simultaneously into bottom-sealed glass tubes through separated feeding tubes. When only one feeding tube is present for each, there will be two semicircular segments. When two crosswisely arranged feeding tubes are present for each, there will be approximately quarter-circular segments of compositions A and B. Although it is possible, in principle, to use even more feeding tubes, this is only more complicated and basically unnecessary since already semicircular segments can be thoroughly mixed by the rotational movement of the fastening element.

Another possibility is that portions A and B are arranged in a slantwise superimposed manner, having the approximate shape of adjacent, slantwise cut slices of a column. Preferably, the angle of inclination of these slices with respect to the longitudinal axis of the tubes is about 45°. However, angles of inclination in the range of between 30° and 60° can also be used, whenever this is desired for production engineering reasons. Thus, there are formed slanting slices of a column which again have separating films at their interfaces formed by reaction of compositions A and B and thus are indefinitely storable.

This embodiment of the glass tubes according to the invention is prepared by filling portions of compositions A and B consecutively into glass tubes which are arranged in a correspondingly slanting position and which are open at the top.

When said portions of compositions A and B are filled consecutively into said tubes, care should be taken that the layers are neither too thick nor too thin. Too many thin layers will result in increased premature use of the two-component adhesive at the interfaces. In addition, the minimum thickness of a layer is limited by the largest grain size of the incorporated fibers or chips. When the layers are too thick and the angle of inclination is too low, sufficient portions of both compositions will be present at too few intersecting planes perpendicular to the longitudinal axis of the glass tubes. It is no longer possible then to sufficiently mix compositions A and B by a simple rotational movement.

If desired, the glass tubes according to the invention can be fused at the top immediately after filling and thus sealed. It is particularly simple and advantageous, to seal the tubes at the top by covering them, in addition, with a thin, curable layer of the two-component adhesive with or without incorporated fibers or chips. This layer of the two-component adhesive will cure and form a simple and stable plug for the glass tube which is filled with all necessary components.

As the components of two-component adhesives, the same may be used, in principle, as those already described in detail in WO 92/18697. In particular, these are aliphatic and cycloaliphatic epoxy resins with monofunctional and bifunctional reactive thinners and adhesion promoters, as well as aliphatic and/or cycloaliphatic polyamines, polyamidoamines, Mannich bases, and adhesion promoters and optionally accelerators for the second component. As the second component, there can also be used multifunctional thioalcohols with adhesion promoters and optionally accelerators. Also useful are, on one hand, diisocyanate-based two-component adhesives with adhesion promoters and conventional additives, and on the other hand, polyhydric alcohols with adhesion promoters and additives, resulting in polyurethanes.

Of course, a fungicide may again be added to one or both of the components of the two-component adhesive such that, especially with boreholes in wood, fungal attack can be prevented or retarded.

As the fibers and chips, the same materials may be used, in principle, as those already described in WO 92/18697. Particularly preferred are metal chips, and care should again be taken that their average lengths are smaller than half the diameter of the borehole.

Since both epoxy resins and polyurethane resins are insensitive to alkali, burnt lime may be added to the components. This additive will bind moisture in the borehole, thus improving the stability of the anchorage and increasing the corrosion resistance of the reinforcement steel in the region of the borehole walls.

The outer diameter of the glass tubes according to the invention should be about the same as the diameter of the fastening element to be inserted. The inside diameter of the borehole should be larger than the diameters of the glass tube and the fastening element by 1 to 3 mm. If the borehole is larger exceptionally, the increased need for two-component adhesive and chips can be met, if necessary, by inserting more than one glass tube into the borehole; in this case, however, care should be taken that an adequate disruption of the glass tube and adequate mixing of the components by the turned-in or knocked-in fastening element is ensured. A very efficient disruption of the glass tube and mixing of the tube's contents is achieved by fastening elements which are slantwise cut and thus act like turning tools and mixers.

It is possible, in principle, to replace the glass tube by another material; however, care is to be taken that this material has the same inertness and about the same brittleness as glass since otherwise it cannot be ensured that after insertion into the borehole the cartridge will be disrupted uniformly throughout and the components are thoroughly mixed. The glass splinters are an additional inert filler which is incorporated into the two-component adhesive. Thus, these glass splinters do not adversely affect the quality of the anchorage of the fastening elements in the boreholes.

The following examples describe in more detail glass tubes according to the invention, the preparation thereof and the use thereof.

EXAMPLES

A mixture of steel chips of the following composition:

| | |
|---|---|
| 0–0.1 mm | 20% |
| 0.1–0.5 mm | 40% |
| 0.5–1,2 mm | 40% | is mixed with the following components of two-component adhesives, the proportion of binder, depending on the viscosity, being from 10 to 33%:

Example 1

| Resin | | Hardener | |
|---|---|---|---|
| Bisphenol A resin | 85% | Polyamine hardener | 95% |
| Reactive thinner | 14% | Accelerator | 4% |
| Adhesion promoter | 1% | Adhesion promoter | 1% |
| | 100% | | 100% |

Example 2

| Resin | | Hardener | |
|---|---|---|---|
| Bisphenol F resin | 90% | Polyamine hardener | 94% |
| Reactive thinner | 9% | Accelerator | 5% |
| Adhesion promoter | 1% | Adhesion promoter | 1% |
| | 100% | | 100% |

Example 3

| Resin | | Hardener | |
|---|---|---|---|
| Bisphenol A resin | 85% | Polyamide hardener | 95% |
| Reactive thinner | 14% | Accelerator | 4% |
| Adhesion promoter | 1% | Adhesion promoter | 1% |
| | 100% | | 100% |

Example 4

| Resin | | Hardener | |
|---|---|---|---|
| Bisphenol F resin | 90% | Polyamide hardener | 94% |
| Reactive thinner | 9% | Accelerator | 5% |
| Adhesion promoter | 1% | Adhesion promoter | 1% |
| | 100% | | 100% |

Example 5

| Resin | | Hardener | |
|---|---|---|---|
| Bisphenol A resin | 85% | Polythioalcohol | 95% |
| Reactive thinner | 14% | Accelerator | 4% |
| Adhesion promoter | 1% | Adhesion promoter | 1% |
| | 100% | | 100% |

Example 6

| Resin | | Hardener | |
|---|---|---|---|
| Bisphenol F resin | 90% | Polythioalcohol | 95% |
| Reactive thinner | 9% | Accelerator | 4% |
| Adhesion promoter | 1% | Adhesion promoter | 1% |
| | 100% | | 100% |

Example 7

| Resin | | Hardener | |
|---|---|---|---|
| Bisphenol A resin | 85% | Polyaminoamide | 95% |
| Reactive thinner | 14% | Accelerator | 4% |
| Adhesion promoter | 1% | Adhesion promoter | 1% |
| | 100% | | 100% |

Example 8

| Resin | | Hardener | |
|---|---|---|---|
| Bisphenol F resin | 85% | Polyaminoamide | 94% |
| Reactive thinner | 9% | Accelerator | 5% |
| Adhesion promoter | 1% | Adhesion promoter | 1% |
| | 100% | | 100% |

Example 9

| Resin | | Hardener | |
|---|---|---|---|
| Novolak epoxy resin | 80% | Polythioalcohol | 95% |
| Reactive thinner | 19% | Accelerator | 4% |
| Adhesion promoter | 1% | Adhesion promoter | 1% |
| | 100% | | 100% |

Example 10

| Resin | | Hardener | |
|---|---|---|---|
| Novolak epoxy resin | 90% | Polythioalcohol | 94% |
| Reactive thinner | 9% | Accelerator | 5% |
| Adhesion promoter | 1% | Adhesion promoter | 1% |
| | 100% | | 100% |

These compositions A and B are pumped into bottom-sealed glass tubes through two separated feeding lines, i.e. simultaneously in approximately equal amounts in a side-by-side fashion whereby two semicircular columns are formed contacting each other at the sectional area. The glass tubes which have been filled almost up to the upper edge are coated after a short period with a mixture of resin and hardener of the same composition without the addition of steel chips which has been prepared immediately before. At the interface between the two semicircular columns, a thin, hardened film forms which separates the major amounts of components A and B from one another. From the mixture of resin and hardener, a sealing plug is formed which prevents leaking of the components until use. Mounting of bonding anchors is performed as in the prior art by turning in, optionally with vibration (percussion drilling).

After curing, anchorages are formed having excellent properties which are equivalent to those of WO 92/18697 and are superior to those according to the Kunststoff-Handbuch, loc. cit.

Example 11

For anchorages in moist concrete, the mixture of steel chips is changed as follows:

| | |
|---|---|
| 0–0.1 mm | 15% |
| 0.1–0.5 mm | 37.5% |
| 0.5–1,2 mm | 37.5% |
| CaO | 10% |

Tubes prepared with the same resins and hardeners as in examples 1 to 10 yield anchorages which have excellent properties even in moist concrete.

Example 12

Glass tubes are arranged in a slanting position with an angle of inclination of about 45° and alternately filled with portions of components A and B. Adjacent layers of the components are formed in the form of slanting slices. At the interfaces, films are again formed which keep the components separated from one another. Sealing is again achieved by a freshly prepared mixture of components A and B or a mixture of resin and hardener of the same composition, but without the addition of steel chips.

The thickness of the slices is from 3 to 5 mm. When glass tubes with an inner diameter of from 10 to 15 mm are used, portions of both component A and component B are present in each horizontal plane intersecting the tube. When introduced in a borehole, adequate uniform mixing of components A and B is achieved by the rotational movement of the anchor.

We claim:

1. A storable glass tube sealed on both ends and containing at least one portion each of compositions A and B, wherein:

composition A comprises the first component of a 2-component adhesive that reacts by polyaddition and fibers and/or chips incorporated in said first component, which is viscous at room temperature;

composition B comprises the second component of the 2-component adhesive and fibers and/or chips incorporated therein, which is viscous at room temperature and decreases in viscosity as the temperature increases;

and wherein the at least one portion of composition A is in immediate 2-dimensional contact with the at least one portion of composition B in planes that are perpendicular to the longitudinal axes of the glass tube.

2. The glass tube according to claim 1 characterized in that the at least one portion of composition A and the at least one portion of composition B are arranged parallel to one another and side-by-side in the axial direction of the glass tube.

3. The glass tube according to claim 1, characterized in that the at least one portion of composition A and the at least one portion of composition B form a column in the axial direction of the tube of alternating layers of composition A and composition B arranged slantwise with respect to the axial direction.

4. The glass tube according to claim 3, characterized in that the angle of inclination of said alternating layers with respect to the longitudinal axis of the tube is about 45 degrees.

5. The glass tube according to claim 1, characterized in that the upper end of the glass tube is sealed by a cured layer comprising said 2-component adhesive.

6. The glass tube according to claim 1, characterized in that at least one of the compositions A and B additionally comprises burnt lime.

7. The glass tube according to claim 1, characterized in that said 2-component adhesive is an epoxy resin.

8. A process for the preparation of a glass tube according to claim 1 comprising the steps of:

feeding, into a bottom-sealed glass tube, each of the compositions A and B through a separate feeding tube, simultaneously, or alternatingly in portions;

cooling the glass tube containing compositions A and B; and sealing the top end of the glass tube.

9. The process according to claim 8, characterized in that the separate feeding tubes have outlets separated from one another by a barrier.

10. A method of using the glass tube according to claim 1 comprising introducing the glass tube into a borehole of an anchoring or fastening element.

11. The use of claim 10 wherein the anchoring or fastening element is a screw, anchor, clamp, or bolt.

12. The glass tube according to claim 2 characterized in that a cross-section of the parallel columns comprises adjacent and approximately semicircular segments of compositions A and B.

13. The glass tube according to claim 4, characterized in that each layer has a thickness of at least the largest size of the incorporated fibers and/or chips.

14. The glass tube according to claim 5, characterized in that the sealing layer incorporates fibers and/or chips.

15. The glass tube of claim 1 further comprising between the at least one portion of composition A and the at least one portion of composition B a film comprising the 2-component adhesive in a hardened state.

16. The process of claim 8, characterized in that the sealing step is performed by either fusing the glass at the top of the tube or by applying and curing a layer comprising the 2-component adhesive.

17. In an anchoring or fastening element containing a borehole, the improvement wherein the glass tube according to claim 1 is disposed in the borehole.

* * * * *